(12) United States Patent
Kayanoki

(10) Patent No.: US 6,703,131 B1
(45) Date of Patent: Mar. 9, 2004

(54) COATED ARTICLE

(75) Inventor: Hisayuki Kayanoki, Ichihara (JP)

(73) Assignee: Nippon Arc Co., Ltd., Chiba (JP)

( * ) Notice: Subject to any disclaimer, the term of this patent is extended or adjusted under 35 U.S.C. 154(b) by 249 days.

(21) Appl. No.: 09/763,455

(22) PCT Filed: Jun. 19, 2000

(86) PCT No.: PCT/JP00/03993

§ 371 (c)(1),
(2), (4) Date: Feb. 23, 2001

(87) PCT Pub. No.: WO00/78879

PCT Pub. Date: Dec. 28, 2000

(30) Foreign Application Priority Data

Jun. 24, 1999 (JP) ............................................ 11-178780
Nov. 10, 1999 (JP) ............................................ 11-319136

(51) Int. Cl.$^7$ ................................................ B32B 9/04
(52) U.S. Cl. ....................... 428/446; 428/448; 428/447; 428/425.5; 524/186; 524/82; 524/431; 524/437
(58) Field of Search ................................ 428/323, 327, 428/331, 423.1, 446, 447, 448, 704, 225.5; 526/224, 324; 524/186, 82, 431, 437

(56) References Cited

U.S. PATENT DOCUMENTS

| | | | |
|---|---|---|---|
| 5,061,659 A | | 10/1991 | Ciolek et al. |
| 5,116,664 A | | 5/1992 | Kimura et al. |
| 5,496,641 A | * | 3/1996 | Mase et al. ............... 428/423.1 |
| 5,559,200 A | * | 9/1996 | Suzuki et al. ............... 526/224 |
| 5,827,584 A | * | 10/1998 | Akao et al. ............... 206/316.1 |
| 5,830,578 A | * | 11/1998 | Ono et al. .................. 351/159 |
| 6,048,910 A | * | 4/2000 | Furuya et al. ............... 427/515 |
| 6,197,101 B1 | * | 3/2001 | Matsumura et al. ... 106/287.11 |

FOREIGN PATENT DOCUMENTS

| | | |
|---|---|---|
| EP | 730168 | 9/1996 |
| EP | 933403 | 8/1999 |
| GB | 1442024 | 7/1976 |
| GB | 2183363 | 6/1987 |
| GB | 2320019 | 8/1998 |
| JP | 54-66914 | 5/1979 |
| JP | 57-174357 | 10/1982 |
| JP | 62-89902 | 4/1987 |
| JP | 63185820 | 8/1988 |
| JP | 63-223076 | 9/1988 |
| JP | 4-242701 | 8/1992 |
| JP | 5-51209 | 3/1993 |
| JP | 6-96745 | 4/1994 |
| JP | 6-329988 | 11/1994 |
| JP | 7-89720 | 4/1995 |
| JP | 7325201 | 12/1995 |
| JP | 7-331121 | 12/1995 |
| JP | 848940 | 2/1996 |
| JP | 8-337422 | 12/1996 |
| JP | 9-5501 | 1/1997 |
| JP | 10-147733 | 6/1998 |
| JP | 10-203311 | 8/1998 |
| JP | 10-221503 | 8/1998 |
| JP | 10-221504 | 8/1998 |
| JP | 10-292135 | 11/1998 |
| JP | 10332902 | 12/1998 |
| JP | 11131021 | 5/1999 |
| JP | 11-133204 | 5/1999 |
| JP | 11-172239 | 6/1999 |

OTHER PUBLICATIONS

G.M Carlson et al., Polym. Sci Technol., vol. 36, pp. 197–212, 1987.

* cited by examiner

*Primary Examiner*—Nathan M. Nutter
*Assistant Examiner*—Melanie Bissett
(74) *Attorney, Agent, or Firm*—Wenderoth, Lind & Ponack, L.L.P.

(57) ABSTRACT

To provide a plastic spectacle lens which has a very durable hard coat layer and primer layer and prevents the cracking and peeling off of the layer and a reduction in the hardness of the layer, and other coated articles. This coated article has a coat layer containing titanium oxide and an organic Co(II) compound on the surface of a substrate.

5 Claims, No Drawings

COATED ARTICLE

FIELD OF THE INVENTION

The present invention relates to an article coated with a resin film, particularly a coated plastic lens having a titanium oxide-containing resin coat layer, other coated articles and a composition for forming a titanium oxide-containing resin coat layer.

DESCRIPTION OF THE PRIOR ART

Since plastic spectacle lenses have such a defect that they are easily scratched, a silicon-based resin or other hard coat layer has been conventionally formed on the surface of a plastic lens substrate. A primer layer made from a resin such as an urethane-based resin has also been formed between this hard coat layer and the surface of the substrate to improve the adhesion of the hard coat layer and the impact resistance of a plastic lens.

However, when a silicone-based hard coat layer is formed on a high-refractive resin lens having a refractive index of 1.50 or more, an interference fringe is formed by the difference of refractive index between the resin lens and the hard coat layer (or primer layer), thereby worsening the appearance of the lens. To solve this problem, JP-A 7-325201 and JP-A 10-332902 (the term "JP-A" as used herein means an "unexamined published Japanese patent application") propose the addition of an oxide having a high refractive index such as titanium oxide ($TiO_2$). (or a composite oxide containing $TiO_2$) to a hard coat or primer to reduce the difference of refractive index between the hard coat layer or primer layer and the substrate so as to prevent an interference fringe.

JP-A 11-131021 discloses a composition for coating comprising the following essential ingredients:
(A) a composite oxide fine particle of tin oxide, titanium oxide and zirconium oxide;
(B) a silane compound having at least one polymerizable reactive group; and
(C) an epoxy (meth)acrylate having a glycidyl group and (meth)acryloyl group in one molecule at the same time.

In the above publication, a silanol or epoxy compound curing catalyst may be added and acetylacetonato containing. Co(II) as the center metal is enumerated as one example of the curing catalyst.

However, the hard coat layer or primer layer containing titanium oxide has such problems as the cracking and peeling off of the layer and a reduction in the hardness of the layer due to insufficient durability.

SUMMARY OF THE INVENTION

It is an object of the present invention to provide a coated article which has a highly durable resin coat layer containing titanium oxide and prevents the cracking and peeling off of the layer and a reduction in the hardness of the layer.

It is another object of the present invention to provide a plastic lens which has a highly durable hard coat layer or primer layer and prevents the cracking and peeling off of the layer and a reduction in the hardness of the layer.

It is still another object of the present invention to provide a solution composition for forming a hard coat layer for a plastic lens.

A further object of the present invention is attained by a solution composition for forming a primer layer for a plastic lens.

Other objects and advantages of the present invention will become apparent from the following description.

Firstly, according to the present invention, the above objects and advantages of the present invention are attained by a coated article comprising a substrate and a coat layer made from a resin composition containing titanium oxide and an organic Co(II) compound and formed on the surface of the substrate.

Secondly, according to the present invention, the above objects and advantages of the present invention are attained by a plastic lens which comprises a plastic lens substrate having a refractive index of 1.50 or more and a hard coat layer formed on the surface of the substrate directly or through a primer layer, the hard coat layer comprising:
(1) 2 to 70 wt % of titanium oxide or a composite oxide thereof having a particle diameter of 1.0 to 100 nm;
(2) 0.1 to 10 wt % of an organic Co(II) compound;
(3) 20 to 97.9 wt % of a silicon resin; and
(4) 0.001 to 10 wt % of a curing catalyst,
and having a refractive index of 1.48 or more and a thickness of 0.1 to 5 μm, the weight percentages of the above components (1), (2) and (3) being based on 100 wt % of the total weight of the components (1), (2) and (3), and the weight percentage of the above component (4) being based on the total weight of the above components (1), (2) and (3).

Thirdly, the above objects and advantages of the present invention are attained by a plastic lens which comprises a plastic lens substrate having a refractive index of 1.50 or more, a primer layer formed on the surface of the substrate, and a hard coat layer comprising a silicone resin as a resin component and formed on the surface of the primer layer, the primer layer comprising:
(1) 2 to 70 wt % of titanium oxide or a composite oxide thereof having a particle diameter of 1.0 to 100 nm;
(2) 0.1 to 10 wt % of an organic Co(II) compound; and
(3) 20 to 97.9 wt % of an urethane resin,
and having a refractive index of 1.48 or more and a thickness of 0.5 to 5 μm, the weight percentages of the above components (1), (2) and (3) being based on 100 wt % of the total weight of the components (1), (2) and (3).

In the fourth place, according to the present invention, the above objects and advantages of the present invention are attained by a solution composition for forming a hard coat layer which comprises:
(1) 2 to 70 wt % in terms of solid content of a sol containing titanium oxide or a composite oxide thereof having a particle diameter of 1.0 to 100 nm dispersed in water or an organic medium;
(2) 0.1 to 10 wt % of an organic Co(II) compound;
(3) 20 to 97.9 wt % of an epoxy group-containing silicon compound represented by the following formula (1):

$$R^1R^2{}_aSi(OR^3)_{3-a} \tag{1}$$

wherein $R_1$ is a group having an epoxy group and 2 to 12 carbon atoms, $R^2$ is an alkyl group or halogenoalkyl group having 1 to 6 carbon atoms, alkenyl group having 2 to 6 carbon atoms, phenyl group or halogenophenyl group, $R^3$ is a hydrogen atom, alkyl group or acyl group having 1 to 4 carbon atoms, and a is 0, 1 or 2,
or a partial hydrolysate thereof; and
(4) 0.001 to 10 wt % of a curing catalyst, the weight percentages of the above components (1), (2) and
(3) being based on 100 wt % of the total weight of the components (1), (2) and (3), and the weight percentage of the above component (4) being based on the total weight of the above components (1), (2) and (3).

In the fifth place, according to the present invention, the above objects and advantages of the present invention are attained by a solution composition for forming a primer layer comprising:
(1) 2 to 70 wt % in terms of solid content of a sol containing titanium oxide or a composite oxide thereof having a particle diameter of 1.0 to 100 nm dispersed in water or an organic medium;
(2) 0.1 to 10 wt % of an organic CO(II) compound;
(3) 10 to 87.9 wt % of a polyol; and
(4) 10 to 87.9 wt % of a polyisocyanate,
the weight percentages of the above components (1), (2), (3) and (4) being based on 100 wt % of the total weight of all the components.

The present invention will be described in detail hereinafter.

A description is first given of the coated article of the present invention.

The coat layer of the coated article is made from a resin composition containing titanium oxide and an organic Co(II) compound.

Co(II) is characterized in that it has an absorption peak at a wavelength of 420 to 550 nm and an organic compound having CO(III) with the main absorption peak at a wavelength of 600 to 800 nm cannot be used in the present invention because it does not have the effect of the organic Co(II) compound of the present invention.

When the titanium oxide-containing resin coat layer contains an organic Co(II) compound and this coat layer is irradiated with ultraviolet rays from sunlight, fluorescent light or other light, ultraviolet rays collide with a titanium oxide particle contained in the coat layer. The titanium oxide particle is excited by ultraviolet rays, thereby forming electrons excited to a conduction band and electron holes having a valence band. The exited electrons and electron holes move toward a polymer in the coat layer, reach the polymer and try to cause an optical catalytic reaction there to decompose the polymer by dissociating a bond, for example, a C—C bond in the polymer. When the organic Co(II) compound is existent in this coat layer, part of excited energy of titanium oxide moves toward the organic Co(II) compound and is converted into heat. Thereby, the decomposition of the polymer is suppressed, thereby retarding the deterioration of the coat layer. As a result, the adhesion of the coat layer to the substrate is retained, the cracking of the coat layer hardly occurs, and the hardness of the coat layer is maintained. Since the excitation energy of titanium oxide is about 3 eV, it is desired that a compound containing this metal ion should have an energy gap corresponding to 2.1 to 2.8 eV in order to receive this energy efficiently. The wavelength of an optical absorption band corresponding to this energy gap is 420 to 550 nm. Therefore, an organic Co(II) compound having an optical absorption peak at 420 to 550 nm is effective. However, it cannot be said that all compounds having this energy gap can receive this energy.

Preferably, the organic CO(II) compound having an absorption peak at a wavelength of 420 to 550 nm used in the present invention dissolves in a solvent for a titanium oxide-containing resin coat layer, such as an alcohol or propylene glycol ether, has compatibility with the resin component of the coat layer and does not impede the physical properties of the resin of the coat layer. Preferred examples of the compound include the above Co(II) ion chelate compounds and fatty acid salts.

The ligand of the chelate compound is preferably what contains an aliphatic chelate structure, as exemplified by acetylacetone, di-n-butoxide-mono-ethyl acetate, di-n-butoxide-mono-methyl acetate, methyl ethyl ketooxime, 2,4-hexanedione, 3,5-heptanedione and acetooxime. A preferred example of the chelate compound is cobalt (II) acetylacetonato.

Preferred examples of the acid of the fatty acid compound include 2-ethyl-hexylic acid, stearic acid, lauric acid, oleic acid, acetic acid, sebacic acid, dodecane diacid, propionic acid, brassylic acid, isobutylic acid, citraconic acid and tetraethylene diamine tetraacetic acid. The fatty acid compound is, for example, a cobalt(II) salt of 2-ethyl-hexylic acid.

Examples of the resin component of the resin coat layer in the present invention include silicon resin, urethane resin, acrylic resin, methacrylic resin, allyl resin, polyester resin, polycarbonate resin, epoxy resin and urethane acrylic resin. The resin coat layer contains titanium oxide and an organic Co(II) compound in addition to the above resin component. The amount of titanium oxide is preferably 2 to 70 wt % and the amount of the organic Co(II) compound is preferably 0.1 to 10 wt %. The resin coat layer preferably has a refractive index of 1.48 or more. The amount of titanium oxide is more preferably 10 to 70 wt %, the most preferably 15 to 60 wt %. The amount of the organic Co(II) compound is more preferably 0.2 to 5 wt %.

The above titanium oxide may have an amorphous structure but preferably a rutile, anatase or brookite crystal structure. Preferably, at least ½, that is, at least 50% of the amount of titanium oxide has at least one of rutile, anatase or brookite crystal structures. Out of these crystal structures, the rutile type is more preferred and at least ½, that is, 50% of the amount of titanium oxide has a rutile type crystal structure. However, as rutile type titanium dioxide is more expensive than anatase type titanium dioxide, anatase type titanium dioxide is preferably used from an economical point of view. The titanium oxide may be a titanium oxide fine particle or a composite oxide of titanium and at least one element selected from the group consisting of Si, Al, Sn, Sb, Ta, Ce, La, Fe, Zn, W, Zr and In. Examples of the composite oxide include a composite oxide fine particle of titanium and iron ($TiO_2.Fe_2O_3$), composite oxide fine particle of titanium and silicon ($TiO_2.SiO_2$), composite oxide fine particle of titanium and cerium ($TiO_2.CeO_2$), composite oxide fine particle of titanium, iron and silicon ($TiO_2.Fe_2O_3.SiO_2$), composite oxide fine particle of titanium, cerium and silicon ($TiO_2.CeO_2.SiO_2$), composite oxide fine particle of titanium, zirconium and silicon ($TiO_2.ZrO_2.SiO_2$) and composite oxide fine particle of titanium, aluminum and silicon ($TiO_2.Al_2.O_3.SiO_2$).

The titanium oxide fine particle or titanium composite oxide fine particle can be obtained by any known method. For example, a hydrous titanic acid gel or sol is prepared by adding an alkali to an aqueous solution of a titanium salt such as titanium chloride or titanium sulfate for neutralization or by passing an aqueous solution of a titanium salt through an ion exchange resin. Thereafter, hydrogen peroxide water is added to the hydrous titanic acid gel or sol, or a mixture thereof to dissolve the hydrous titanic acid so as to prepare a uniform aqueous solution. Further, titanic acid is hydrolyzed by heating to obtain a titanium oxide sol containing titanium oxide dispersed therein. In the step before the heat treatment, an inorganic compound of one element or two or more elements selected from the group consisting of Si, Al, Sn, Sb, Ta, Ce, La, Fe, Zn, W, Zr and In is added to obtain a composite oxide sol. For example, JP-A 63-185820 discloses a process for producing a silica-titanium or titanium-silica-zirconia composite oxide sol.

Further, the surface of the above titanium oxide fine particle or titanium composite oxide fine particle may be surface coated with (one layer or two or more layers of) silicon oxide, a mixture of silicon oxide and an oxide of at least one element selected from the group consisting of Al, Sn, Sb, Ta, Ce, La, Fe, Zn, W, Zr and In, or a composite oxide. The fine particle can be obtained by any known method. For example, JP-A 8-48940 discloses a process for producing a composite oxide sol by coating a titanium-silica composite oxide fine particle with silica-zirconia composite oxide. When titanium oxide is existent in the form of a composite oxide fine particle or surface coated fine particle, the weight of a metal oxide other than titanium oxide contained in the fine particle is excluded (ignored) in the calculation of the amount of titanium oxide.

The titanium oxide may be amorphous but preferably has an anatase or rutile crystal structure. Particularly preferably, the titanium oxide has a rutile crystal structure.

When the titanium oxide is a composite oxide fine particle, to improve its dispersibility in a solvent, the surface of the composite oxide fine particle can be modified by an organic silane compound or an amine. The amount of the organic silane compound is 0 to 20 wt % based on the weight of the fine particle. This surface modification may be carried out while an organic silane compound having a hydrolyzable group is not hydrolyzed or after it is hydrolyzed.

The organic silane compound for modifying the surface of the composite oxide fine particle is, for example, an organic silane represented by the formula $R_3SiX$, $R_2SiX_2$, $RSiX_3$ or $SiX_4$ (R is an organic group having alkyl, phenyl, vinyl, methacryloxy, mercapto, amino, epoxy or ureide and X is a hydrolyzable group), such as trimethyl methoxysilane, diphenyl dimethoxysilane, vinyl trimethoxysilane, γ-methacryloxypropyldimethyl methoxysilane, γ-aminopropyl triethoxysilane, glycidoxypropyl trimethoxysilane, γ-ureidopropyl triethoxysilane or tetra-ethyl orthosilicate.

Examples of the amine for modifying the surface of the fine particle include alkylamines such as ammonium and ethylamine, aralkylamines such as benzylamine, alicyclic amines such as piperidine and alkanolamines such as monoethanolamine.

To modify the surface of the fine particle with an organic silicon compound or amine, for example, a composite oxide fine particle is mixed with an alcohol solution of the compound, a predetermined amount of water and optionally a catalyst are added, and the resulting mixture is left to stand at normal temperature for a predetermined time or heated. The surface of the composite oxide fine particle can be modified by adding a hydrolysate of the compound and a composite oxide fine particle to a mixture of water and an alcohol and by heating.

The resin coat layer of the present invention may contain an inorganic oxide, antioxidant, ultraviolet light absorber, leveling agent, lubricity modifier, antistatic agent, bluing agent and the like as required in addition to the above resin, titanium oxide and organic Co(II) compound. The inorganic oxide is an oxide or composite oxide of at least one element selected from the group consisting of Si, Al, Sn, Sb, Ta, La, Zn, W, Zr and In and a fine particle having a particle diameter of 1 to 100 nm. The inorganic oxide may be contained in an amount of 0 to 70 wt % in terms of nonvolatile content.

The above antioxidant is preferably what has a sulfide structure (C—S—C structure), more preferably a hindered phenolic compound having a sulfide structure. Examples of the antioxidant include 4,4'-thiobis(3-methyl-6-t-butylphenol), 2,2-thio-diethylenebis[3-(3,5-di-t-butyl-4-hydroxyphenyl)propionate], 2,4-bis-(n-octylthio)-6-(4-hydroxy-3,5-di-t-butylanilino)-1,3,5-triazine, didodecyl 3,3'-thiobispropionate, dibctadecyl 3,3'-thiobispropionate, dimyristyl 3,3'-thiobispropionate and 2,4-[bis(octylthio) methyl]-O-cresol. The antioxidant is preferably contained in an amount of 5 wt % or less.

The leveling agent or lubricity modifier is preferably a copolymer of polyoxyalkylene and polydimethylsiloxane or a copolymer of polyoxyalkylene and fluorocarbon. They are preferably used in an amount of 0.001 to 10 parts by weight based on the total amount of the coating solution.

The thickness of the resin coat layer in the present invention, which differs according to the purpose of a resin coated article, is preferably 0.10 to 10 μm.

The coated article of the present invention is produced by coating the surface of the substrate with a coating solution for a resin coat layer by dip coating, spinner coating, spray coating or flow coating and drying the coating. solution to form a film and heating the film thus formed on the surface of the substrate at a temperature lower than the heat resistant temperature of the substrate.

When an ultraviolet curable resin is used as a matrix component of the coating solution for a resin coat layer, the coated article of the present invention can be produced by coating the surface of the'substrate with the coating solution and irradiating the surface of the substrate coated with the coating solution with ultraviolet radiation having a predetermined wavelength to cure the resin.

The coated article of the present invention can be a plastic lens having a hard coat layer directly on the surface of a substrate. In this case, the titanium oxide-containing resin coat layer in the present invention is used as the hard coat layer. The coated article of the present invention can be a plastic lens having a primer layer and a hard coat layer formed on the surface of a substrate in the order named. In this case, the titanium oxide-containing resin coat layer. of the present invention is used as either one or both of the primer layer and hard coat layer.

A preferred mode of the titanium oxide-containing resin coat layer of the present invention is a hard coat layer of a titanium oxide-containing silicon resin having a refractive index of 1.48 or more and a thickness of 0.1 to 5 μm formed on the surface of the substrate of a plastic lens having a refractive index of 1.50 or more directly or through a primer layer.

Another preferred mode of the titanium oxide-containing resin coat layer of the present invention is a primer layer of a titanium oxide-containing urethane resin having a refractive index of 1.48 or more and a thickness of 0.5 to 5 μm formed between the surface of the substrate of a plastic lens having a refractive index of 1.50 or more and a hard coat layer of a silicon resin having a refractive index of 1.48 or more formed thereon.

Still another preferred mode of the titanium oxide-containing resin coat layer of the present invention is a combination of a primer layer and a hard coat layer in a plastic lens which comprises the surface of the substrate of a plastic lens having a refractive index of 1.50 or more, a primer layer of a titanium oxide-containing urethane resin having a thickness of 0.5 to 5 μm formed on the surface of the substrate and a hard coat layer of a titanium oxide-containing silicon resin having a refractive index of 1.48 or more and a thickness of 0.1 to 5 μm formed on the primer layer. That is, the titanium oxide-containing resin coat layer of the present invention is used as the both layers.

The hard coat layer when the titanium oxide-containing silicon resin coat layer of the present invention is formed on the surface of a plastic lens substrate as a hard coat layer will be described in detail hereinafter.

HARD COAT LAYER

A coating solution (solution composition) for forming a silicone hard coat layer will be described.

The coating solution for forming a hard coat layer comprises the following components (1) to (4):

(1) 2 to 70 wt % in terms of solid content of a sol containing titanium oxide or a composite oxide thereof having a particle diameter of 1.0 to 100 nm dispersed in water or an organic medium;

(2) 0.1 to 10 wt % of an organic Co(II) compound;

(3) 20 to 97.9 wt % of an epoxy group-containing silicon compound represented by the following formula (1):

$$R^1R^2_a Si(OR^3)_{3-a} \quad (1)$$

wherein $R^1$ is a group having an epoxy group and 2 to 12 carbon atoms, $R^2$ is an alkyl group or halogenoalkyl group having 1 to 6 carbon atoms, alkenyl group having 2 to 6 carbon atoms, or phenyl group or halogenophenyl group, $R^3$ is a hydrogen atom, alkyl group or acyl group having 1 to 4 carbon atoms, and a is 0, 1 or 2, or a partial hydrolysate thereof; and (4) 0.001 to 10 wt % of a curing catalyst.

The components (1) and (2) have already been described above.

Examples of the epoxy group-containing silicon compound as the component (3) include γ-glycidoxypropyl trimethoxysilane, β-glycidoxypropyl trimethoxysilane, γ-glycidoxypropyl triethoxysilane, β-glycidoxypropyl triethoxysilane, γ-glycidoxypropylmethyl dimethoxysilane, γ-glycidoxypropylmethyl diethoxysilane and β-(3,4-epoxycyclohexyl)ethyl trimethoxysilane.

Examples of the curing catalyst (4) of the composition for forming a hard coat layer include alkali metal salts and ammonium salts of carboxylic acids, metal salts and ammonium salts of acetylacetone, metal salts of ethyl acetoacetate, metal salts coordinated with acetylacetone and ethyl acetoacetate, metal salt hydrates of ethylene diamine, primary to tertiary amines, polyalkylene amines, sulfonates, magnesium perchlorate, ammonium perchlorates, and combinations of these compounds and organic mercaptan or mercaptoalkylenesilane. The curing catalyst may be added when a composition for forming a hard coat layer is prepared or right before a composition for forming a hard coat layer is applied.

The weight percentages of the above components (1), (2) and (3) are based on 100 wt % of the total weight of the components (1), (2) and (3), and the weight percentage of the above component (4) is based on the total weight of the above components (1), (2) and (3).

The amount of the component (1) is preferably 5 to 60 wt %, the amount of the component (2) is preferably 0.2 to 5 wt %, and the amount of the component (3) is preferably 35 to 94.8 wt %. The amount of the component (4) is preferably 0.01 to 8 wt %.

The coating solution for forming a hard coat layer may contain the following components (D) and (E) as required in addition to the above components (1) to (4).

Component (D)

A fine particle of an oxide of at least one element selected from the group consisting of Si, Al, Sn, Sb, Ta, Ce, La, Fe, Zn, W, Zr and In, such as $SiO_2$, $Al_2O_3$, $SnO_2$, $Sb_2O_5$, $Ta_2O_5$, CeO, $La_2O_3$, $Fe_2O_3$, ZnO, $WO_3$, $ZrO_2$ or $In_2O_3$ in the form of a sol solution and having a particle diameter of 1.0 to 100 nm may be contained in a total amount of 80 wt % or less.

When the fine particle is a composite oxide, its surface may be modified by an organic silane compound or amine to improve its dispersibility in a solvent. It should be understood that surface modification is completely the same as that for a titanium composite oxide. When the above titanium oxide is a titanium composite oxide, for example, a $TiO_2$—$ZrO_2$—$SiO_2$ composite oxide fine particle, a metal oxide other than titanium oxide contained in the composite oxide, for example, zirconium oxide and silicon oxide are the components (D).

The fine particle of the component (D) is preferably dispersed in water or an organic solvent such as an alcohol in an amount of 5 to 80 wt %. The fine particle of the component (D) is contained in the coating solution for forming a hard coat layer in an amount of 70 wt % or less in terms of solid content.

Component (E)

The component (E) is an antioxidant, preferably an antioxidant having a C—S—C structure as described above.

The following components (F-1) to (F-14) which can react with a hydrolyzed silanol group and epoxy group may be used to improve physical properties such as dyability, heat resistance, water resistance, antistatic properties and surface hardness or assist a catalytic function, in addition to the above components (A) to (E).

Component (F-1)

The component (F-1) is an organic compound having only one OH or SH group in the molecule, at least one group selected from the group consisting of —O—, —CO—O—, —S—, —CO—S— and —CS—S— in the molecular main chain and further at least one unsaturated group and soluble in water or a lower alcohol having 4 or less carbon atoms.

The above compound is preferably a compound represented by the following formula (2):

$$R^4—X—R^5YH \quad (2)$$

wherein $R^4$ is a monovalent hydrocarbon group having at least one unsaturated group and may contain oxygen and sulfur atoms, $R^5$ is a divalent hydrocarbon group having 2 or more carbon atoms and may contain oxygen and sulfur atoms, and X and Y are each independently an oxygen atom or sulfur atom.

Examples of the compound represented by the above formula (2) include polyethylene glycol monomethacrylate, poly(butanediol)monoacrylate, poly(butanediol) monomethacrylate, 1,4-butanediolmonovinyl ether, 1,6-hexanedithiol monoacrylate, di(acryloxyethyl) hydroxyethylamine, 2-hydroxy-3-phenoxypropyl acrylate, pentaerythritol triacrylate, 2-hydroxybutyl acrylate, 3-acryloyloxyglycerin monomethacrylate, 2-hydroxy-1,3-dimethacryloxypropane and 2-mercaptoethyl acrylate.

Out of the above compounds of the formula (2), preferred are compounds represented by the following formula (3):

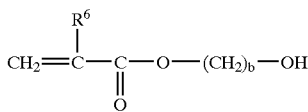
(3)

wherein $R^6$ is a hydrogen atom or methyl group, and b is an integer of 2 to 10, preferably 4 to 6, compounds represented by the following formula (4):

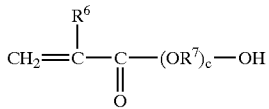
(4)

wherein $R^6$ is a hydrogen atom or methyl group, $R^7$ is —$CH_2CH_2$—, —$CH_2CH(CH_3)$— or —$CH(CH_3)CH_2$—, and c is an integer of 2 to 9, preferably 2 to 4, compounds represented by the following formula (5):

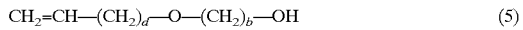
(5)

wherein b is an integer of 4 to 10, and d is 0 or 1, and compounds represented by the following formula (6):

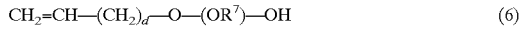
(6)

wherein $R^7$ is —$CH_2CH_2$—, —$CH_2CH(CH_3)$— or —$CH(CH_3)CH_2$—, c is an integer of 2 to 9, and d is 0 or 1.

The compounds of the above formula (3) include 4-hydroxybutyl acrylate and 4-hydroxybutyl methacrylate.

The compounds of the above formula (4) include diethylene glycol monoacrylate, tetraethylene glycol monoacrylate, polyethylene glycol monoacrylate, tripropylene glycol monoacrylate, polypropylene glycol monoacrylate, diethylene glycol monomethacrylate, tetraethylene glycol monomethacrylate, polyethylene glycol ponomethacrylate, tripropylene glycol monomethacrylate and olypropylene glycol monomethacrylate.

The compounds of the above formula (5) include 4-hydroxybutylallyl ether and 4-hydroxybutylvinyl ether.

The compounds of the above formula (6) include diethylene glycol monoallyl ether and triethylene glycol monovinyl ether.

The above component (F-1) is used in an amount of 0.001 to 50 wt % based on the total solid content of the base resin.

Component (F-2)

The component (F-2) is an unsaturated dibasic acid. Examples of the component (F-2) include itaconic acid, succinic acid, malonic acid, glutaric acid, adipic acid, pimelic acid, suberic acid, azelaic acid, sebacic acid, fumaric acid and maleic acid.

Component (F-3)

The component (F-3) is an cyclic anhydride of an unsaturated dibasic acid. Examples of the component (F-3) include succinic anhydride, glutaric anhydride, trimellitic anhydride, pyromellitic anhydride, phthalic anhydride and maleic anhydride.

Component (F-4)

The component (F-4) is an imide compound of an unsaturated dibasic acid. Examples of the component (F-4) include succinic acid imide, glutaric acid imide, phthalic acid imide and maleic acid imide.

Component (F-5)

The component (F-5) is a saturated polycarboxylic acid. Examples of the component (F-5) include adipic acid and suberic acid.

Component (F-6)

The component (F-6) is an cyclic anhydride of a saturated polycarboxylic acid. Examples of the component (F-6) include cyclic anhydrides of saturated polycarboxylic acids as the component (F-5), such as adipic anhydride.

Component (F-7)

The component (F-7) is an imide compound of a saturated polycarboxylic acid. Examples of the component (F-7) include cyclic anhydrides of the above saturated polycarboxylic acids (component (F-5)), such as adipic acid imide.

Component (F-8)

The component (F-8) is an amine. Examples of the component (F-8) include polymethylene diamine, polyether diamine, diethylene triamine, iminobispropylamine, bishexamethylene triamine, diethylene triamine, tetraethylene pentaamine, pentaethylene hexaamine, pentaethylene hexamine, dimethylamino propylamine, aminoethyl ethanolamine, methyliminobispropylamine, menthanediamine, N-aminomethyl piperazine, 1,3-diaminocyclohexane, isophorone diamine, metaxylene diamine, tetrachloroparaxylene diamine, methaphenilene diamine, 4,4-methylene dianiline, diaminodiphenylsulfone, benzidine, toluidine, diaminodiphenyl ether, 4,4'-thiodianiline, 4,4'-bis(o-toluidine)dianisidine, o-phenylene diamine, 2,4-toluene diamine, methylenebis(o-chloroaniline), diaminiditolylsulfone, bis(3,4-diaminophenyl)sulfone, 2,6-diaminopyridine, 4-chloro-o-phenylene diamine, 4-methoxy-6-methyl-m-phenylene diamine, m-aminobenzylamine, N,N,N',N'-tetramethyl-1,3-butane diamine, N,N,N',N'-tetramethyl-p-phenylene diamine, tetramethyl guanidine, triethanol amine, 2-dimethylamino-2-hydroxypropane, N,N'-dimethylpiperazine, N,N'-bis[(2-hydroxy)propyl] piperazine, N-methylmorpholine, hexamethylene tetramine, pyridine, piperazine, quinoline, benzyldimethylamine, α-methylbenzylmethylamine, 2-(dimethylaminomethyl) phenol, 2,4,6-tris(dimethylaminomethylol)phenol, N-methylpiperazine, pyrrolidine and morpholine.

An adduct of the above mine with an organic carboxylic acid, cyclic ether, ketone, aldehyde or hydroquinone, or a condensate of the above amine may be used like the above amines.

Component (F-9)

The component (F-9) is urea and a formaldehyde adduct thereof.

Component (F-10)

The component (F-10) is an alkyl-substituted methylol melamine.

Component (F-11)

The component (F-11) is a compound having two or more OH groups or SH groups. Examples of the component (F-11) include 1,4-butanediol, 1,6-hexanediol, 1,9-nonanediol, 1,10-decanediol, ethylene glycol, diethylene glycol, triethylene glycol, tetraethylene glycol, polyethylene glycol, propylene glycol, tripropylene glycol, polypropylene glycol, trimethylol propane, neopentyl glycol, catechol, resorcinol, alkylene glycol, polyvinyl alcohol, polycaprolactone diol, polycaprolactone triol and polycaprolactone tetraol.

Component (F-12)

The component (F-12) is a compound having two or more epoxy groups. Examples of the component (F-12) include glycidyl ethers of polyhydric alcohols as the component (F-11).

Component (F-13)

The component (F-13) is a dicyandiamide, hydrazide, thiourea, guanidine, ethyleneimine, sulfoneamide or derivative thereof.

Component (F-14)

The component (F-14) is an organic silicon compound represented by the following formula (7):

$$R^8{}_fR^9{}_eSi(OR^{10})_{4-f-e} \qquad (7)$$

wherein $R^9$ is an alkyl group having 1 to 6 carbon atoms, aryl group, alkenyl group, halogenated alkyl group or halogenated aryl group, $R_{10}$ is a hydrogen atom, alkyl group having 1 to 4 carbon atoms, acyl group or alkylacyl group, $R^8$ is selected from an alkyl group having 1 to 4 carbon atoms, halogenated alkyl group, aryl group and halogenated aryl group having 6 to 12 carbon atoms, methacryloxyalkyl group having 5 to 8 carbon atoms, ureidealkylene group having 2 to 10 carbon atoms, aromatic ureidealkylene group, halogenated aromatic alkylene group and mercaptoalkylene group, f is 1, 2 or 3, and e is 0, 1 or 2, or a partial hydrolysate thereof.

The component (F-14) may be added in an amount of 100 parts or less by weight in terms of solid content based on 100 parts by weight of the total solid content of the base resin.

Examples of the compound of the above formula (7) include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, γ-acryloxypropyldimethylmethoxysilane, γ-methacryloxypropyldimethylmethoxysilane, γ-mercaptopropyldimethylmethoxysilane, γ-mercaptopropyldimethylethoxysilane, N-β(aminoethyl)γ-aminopropyldimethylmethoxysilane, γ-aminopropyldimethylmethoxysilane, γ-aminopropyldimethylethoxysilane, γ-glycidoxypropyldimethylmethoxysilane, γ-glycidoxypropyldimethoxyethoxysilane, β-(3,4-epoxycyclohexyl)ethyldimethylmethoxysilane, dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropyldimethyldimethoxysilane, γ-mercaptopropylmethyldimethoxysilane, γ-mercaptopropylmethyldiethoxysilane, N-β(aminoethyl-)γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethoxydiethoxysilane, β-(3,4-epoxycyclohexyl)ethylmethyldimethoxysilane, methyltrimethoxysilane, ethyltrimethoxysilane, Gmethyltriethoxysilan, ethyltriethoxysilane, phenyltrimethoxysilane, phenyltriethoxysilane, vinyltrimethoxysilane, vinyltriethoxysilane, vinyl(β-methoxyethoxy)silane, γ-acryloxypropyltrimethoxysilane, γ-methacryloxypropyltrimethoxysilane, γ-mercaptopropyltrimethoxysilane, γ-mercaptopropyltriethoxysilane, N-β(aminoethyl) γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, γ-glycidoxypropyltriethoxysilane, β-(3,4-epoxycyclohexyl) ethyltrimethoxysilane, tetraethyl orthosilicate and tetramethyl orthosilicate.

The above components (F-1) to (F-14) may be added in a total amount of 0.001 to 70 wt % based on the total solid content of the base resin.

The solvent for the composition for forming a hard coat layer is a glycol, aliphatic cyclic ketone, acetate or alcohol. Examples of the glycol include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, propylene glycol monomethyl ether, ethylene glycol monoethyl ether and ethylene glycol monobutyl ether. Examples of the aliphatic cyclic ketone include cyclohexanone, o-methylcyclohexanone, m-methylcyclohexanone and p-methylcyclohexanone. Examples of the acetate include ethyl acetate, n-propyl acetate and n-butyl acetate. Examples of the alcohol include methanol, ethanol, 1-propanol and 2-propanol. Solvent naphtha and methyl ethyl ketone may also be used as a solvent.

The solvent is used to ensure that the solids content of the composition for forming a hard coat layer should be 5 to 50 wt %.

Water is necessary to hydrolyze the component (C) and the component (F-14) and used in an amount 1.0 to 10 times the theoretical amount of hydrolysis.

The composition for forming a hard coat layer may further contain a leveling agent, weatherability modifier, antistatic agent, colorant and dye for a cured film. Examples of the leveling agent out of these include a copolymer of polyoxyalkylene and polydimethylsiloxane and a copolymer of polyoxyalkylene and fluorocarbon. The leveling agent is used in an amount of 0.001 to 10 parts by weight in terms of solid content in the composition for forming a hard coat layer.

The composition for forming a hard coat layer is applied to the surface of the substrate directly or the surface of the primer layer formed on the surface of the substrate and cured. Coating is appropriately selected from dip coating, flow coating, spinner coating and spray coating. Curing conditions include a temperature of 90 to 120° C. and a time of 30 minutes to 24 hours, for example. The optimum conditions are preferably selected from these conditions.

The thickness of the hard coat layer is preferably 0.1 to 5 μm. When the thickness of the film is smaller than 0.1 μm, hardness may lower and when the thickness is larger than 5 μm, the film may crack. The thickness of the hard coat layer is more preferably 0.5 to 5 μm.

A detailed description is subsequently given of a case where the titanium oxide-containing urethane resin coat layer of the present invention is formed on the surface of the plastic lens substrate as a primer layer.

Primer Layer

A solution composition for forming a primer layer (film) contains the following components (1) to (4):

(1) 2 to 70 wt % in terms of solid content of a sol containing titanium oxide or a composite oxide thereof having a particle diameter of 1.0 to 100 nm dispersed in water or an organic medium;

(2) 0.1 to 10 wt % of an organic Co(II) compound;

(3) 10 to 87.9 wt % of a polyol; and (4) 10 to 87.9 wt % of a polyisocyanate.

The components (1) and (2) has already described above. Examples of the polyol as the component (3) include olyester polyols, polyether polyols, acrylic polyols and polycarbonate polyols. Out of these, polyester polyols are preferred.

The polyester polyols are obtained by carrying out the dehydration condensation of a polybasic acid and a compound having active hydrogen. Examples of the polybasic acid include organic acids such as isophthalic acid, phthalic acid, phthalic anhydride, hydrogenated phthalic acid, fumaric acid, dimerized linolenic acid, maleic acid and saturated aliphatic dibasic acids having 4 to 8 carbon atoms. These polybasic acids may be used alone or in combination of two or more. Examples of the compound having active hydrogen include glycols such as ethylene glycol, propylene glycol, butylene glycol, hexylene glycol and diethylene glycol; adducts of trimethylolpropane, hexanetriol, glycerin, trimethylolethane, pentaerythritol, polycaprolactone diol, polycaprolactone triol, polycaprolactone tetraol and bisphenol A with ethylene glycol and propylene; adducts of the above compounds with bromine; and diols having a chemical structure composed of 4,4'-thiobisbenzenethiol. These compounds having active hydrogen may be used alone or in combination of two or more.

The above polyester polyols may be acquired as commercially available products such as Demosphen Series (of Sumitomo-Bayer Co., Ltd.), Nipporan Series (of Nippon Polyurethane Co., Ltd.), Takerac Series (of Takeda Chemical Industries, Ltd.), Adeca New Ace Series (of Asaki Denka Kogyo K. K.) and Barnoc (of Dainippon Ink and Chemicals, Inc.).

The polycarbonate polyols may be acquired as commercially available products such as Nipporan 980 Series (of Nippon Polyurethane Co., Ltd.) and Carbodiol (of Toa Corporation.), the polyether polyols may be acquired as commercially available products such as Adecapolyether (of Asahi Denka Kogyo K. K.), Actocall (of Takeda Chemical Industries, Ltd.) and PPG-Diol Series (of Mitsui Toatsu Chemicals Inc.) and the acrylic polyols may be acquired as commercially available products such as Takerac (of Takeda Chemical Industries, Ltd.) and Acrydic (of Dainippon Ink and Chemicals, Inc.). They are preferably used to adjust the physical properties of urethane resins.

The polyisocyanate may be an aliphatic polyisocyanate or polyisocyanate having an aromatic ring. The polyisocyanate is preferably diisocyanate having two or more isocyanate groups (NCO group) in the molecule.

Examples of the polyisocyanate include hexamethylene diisocyanate, 1,3,3-trimethylhexamethylene diisocyanate, isophorone diisocyanate, 4,4'-dicyclohexylmethane diisocyanate, xylylene diisocyanate, tetramethylxylylene diisocyanate, hydrogenated xylylene diisocyanate, tolylene diisocyanate, diphenylmethane diisocyanate, hydrogenated diphenylmethane diisocyanate, 1,5-naphthalene diisocyanate and tetramethylxylylene diisocyanate. These polyisocyanates may be used as a modified product, isocyanurate, allophanate, burette, carbodiimide or adduct such as trimer.

The polyisocyanate may be blocked by a blocking agent. Examples of the blocking agent include acetylacetone, diethyl malonate, dimethyl malonate, 2,4-hexanedione, 3,5-heptanedione, acetooxime, butanoneoxime, methyl ethyl ketooxime and caprolactam. Out of these, β-diketone such as acetylacetone and methyl ethyl ketooxime are preferred.

The isocyanate blocked by a blocking agent can be synthesized by known technologies such as methods described in British Patent No. 1442024, Polym. Sci. Technol., 36. 197 (1987), and Coating Technology 31, 161 (1992).

When the polyisocyanate is an aromatic polyisocyanate such as xylylene diisocyanate or tetramethylxylene diisocyanate, it can be advantageously used as a modified product, adduct or prepolymer.

When the polyisocyanate is an aliphatic polyisocyanate, it is blocked by β-diketone and advantageously used. Particularly when hexamethylene diisocyanate is used as a cyclic trimer blocked by β-diketone, the primer composition can be advantageously provided as a one-part type composition.

The primer composition may contain the above polyol and polyisocyanate while they are not reacted with each other or may contain a prepolymer or thermoplastic (linear) polymer obtained by reacting the above polyol and polyisocyanate.

When the primer composition contains the above polyol and polyisocyanate while they are not reacted with each other, the ratio (NCO/OH) of the number of equivalents of the isocyanate group (NCO) of the polyisocyanate to the number of equivalents of the hydroxyl group (OH) of the polyol is preferably in the range of 0.7 to 1.5. When the ratio is smaller than 0.7, the adhesion of the hard coat layer to the obtained primer layer may decrease and when the ratio is larger than 1.5, the primer layer may whiten or the adhesion of the hard coat layer may lower. The (NCO/OH) ratio is more preferably in the range of 0.8 to 1.2.

In the primer composition, the weight percentages of the above components (1), (2), (3) and (4) are based on 100 wt % of the total weight of all the components.

The amount of the component (1) is preferably 3 to 65 wt %, the amount of the component (2) is preferably 0.2 to 5 wt %, the amount of the component (3) is preferably 12 to 84.8 wt %, and the amount of the component (4) is preferably 12 to 84.8 wt %.

The primer composition may further contain the same oxide fine particle (component (D)) as in the above hard coat composition in an amount of 80 wt % or less as required to approximate the refractive index of the primer layer to that of the lens.

The primer composition may optionally contain a curing catalyst, leveling agent, lubricity modifier, weatherability modifier, antistatic agent, colorant, bluing agent and the like. The type and content of the curing catalyst are the same as the curing catalyst for the above composition for forming a hard coat layer.

The primer composition in the present invention is provided as an organic solvent or aqueous solution. Examples of the organic solvent are the same as those enumerated for the above hard coat, such as glycols, aliphatic cyclic ketones, acetates and alcohols. The solvent is used in an amount of 2 to 50 wt % in terms of solid content in the primer composition.

The primer composition is applied to the surface of the substrate and cured. Coating is appropriately selected from dip coating, flow coating, spinner coating and spray coating. Preferred curing conditions include a temperature of 85 to 120° C. and a time of 15 minutes to 10 hours. The optimum conditions are preferably selected from the above conditions.

The thickness of the primer layer is preferably 0.5 to 5 µm. When the thickness is smaller than 0.5 µm, the effect of improving the impact resistance of a coated article is small and when the thickness is larger than 5 µm, the hardness of the hard coat layer to be formed on the primer layer may lower.

An anti-reflection layer which comprises a single-layer or multiple layers of an inorganic material may be formed on the hard coat layer. This makes it possible to suppress the reflection of visible light and improve visible light transmission and weatherability. Examples of the inorganic material include $SiO$, $SiO_2$, $Si_3N_4$, $TiO_2$, $ZrO_2$, $Al_2O_3$, $MgF_2$ and $Ta_2O_5$. The anti-reflection film can be made thin by a vacuum deposition method or the like.

The substrate in the present invention may be a transparent substrate made from a plastic such as a polyurethane resin, methacrylic polymer, allyl polymer or copolymer thereof, or glass having a refractive index of 1.50 or more. Examples of the substrate include substrates for use in optical lenses such as spectacle lenses and camera lenses, display element filters, glass sheets for construction, auto window glass and light covers for use in automobiles.

To produce the resin coated article of the present invention, a substrate whose surface has been treated with an alkali, acid or surfactant, which is polished with inorganic or organic fine particles, or which is subjected to a primer treatment, plasma treatment, corona treatment or flame treatment may be used as the substrate to improve the adhesion of the coat layer to the lens substrate.

One preferred mode of the liquid composition for forming a primer layer for the coated article of the present invention is a liquid composition for forming a primer layer which contains the following components (1) to (4):

(1) a sol containing titanium oxide or a composite oxide thereof having a particle diameter of 1.0 to 100 nm dispersed in water or an organic solvent;

(2) a Co(II) chelate compound or fatty acid compound, (3) a polyester pblyol; and (4) a polyisocyanate.

Preferably, the above component (1) is contained in an amount of 2 to 70 wt %, the component (2) in an amount of 0.1 to 10 wt %, the component (3) in an amount of 10 to 87.9 wt % and the component (4) in an amount of 10 to 87.9 wt % in terms of solid content.

One preferred mode of the coated article of the present invention is a plastic lens comprising a substrate having a refractive index of 1.50 or more and a hard coat layer which is essentially composed of a silicon resin, has a thickness of 0.1 to 5 µm and a refractive index of 1.48 or more, and is formed on the surface of the plastic lens substrate directly or through a primer layer, the hard coat layer comprising:

(1) 2 to 70 wt % of titanium oxide or a composite oxide thereof having a particle diameter of 1.0 to 100 nm;

(2) 0.1 to 10 wt % of a Co(II) chelate compound or fatty acid compound,:

(3) 20 to 97.9 wt % of a silicon-based resin; and (4) 0.001 to 10 wt % of a curing catalyst.

Another preferred mode of the coated article of the present invention is a plastic lens comprising a substrate having a refractive index of 1.50 or more, a primer layer which is essentially composed of an urethane resin and has a thickness of 0.5 to 5 µm and a refractive index of 1.48 or more, and a hard coat layer which is essentially composed of a silicon resin, are formed on the surface of the substrate in the order named, the primer layer comprising:

(1) 2 to 70 wt % of titanium oxide or a composite oxide thereof having a particle diameter of 1.0 to 100 nm;

(2) 0.1 to 10 wt % of a Co(II) chelate compound or fatty acid compound; and (3) 20 to 97.9 wt % of an urethane-based resin.

EXAMPLE

The following examples are provided for the purpose of further illustrating the present invention but are in no way to betaken as limiting.

Preparation of Primer Coat Solutions 1 to 5

64 g of apolyester polyol comprising isophthalic acid and 1,6-hexanediol and having an average molecular weight of 940 and a hydroxyl group value of 120 mgKOH/g and 65 g of a butyl acetate solution containing 75 wt % of a trimer of hexamethylene diisocyanate blocked by β-diketone were prepared and mixed with 710 g of propylene glycol monomethyl ether and stirred until a uniform solution was obtained, 160 g of a composite oxide sol 1 which consisted of $TiO_2$, $Fe_2O_3$ and $SiO_2$ ($TiO_2/Fe_2O_3/SiO_2$=81/1/18 (weight ratio), titanium oxide was of an anatase type, dispersed in methanol, and had an average particle diameter of 10 nm and a nonvolatile content of 30%) was added, stirred and mixed until a uniform solution was obtained, and then 0.5 g of the Florad FC-430 of 3M Co., Ltd. was added as a leveling agent and stirred. The obtained composition was designated as primer coat solution 1.

1 g of CO(II) acetylacetonato dehydrate was added to 1,000 g of the separately prepared primer coat solution 1 and stirred to prepare a primer coat solution 2.

31 g of a polyester polyol comprising isophthalic acid and adipic acid (molar ratio of 6:4), 1,6-hexanediol and trimethylolpropane and having an average molecular weight of 650 and a hydroxyl group value of 260 mgKOH/g, 68 g of a butyl acetate solution containing 75 wt % of a trimer of hexamethylene diisocyanate blocked by β-diketone and 634 g of propylene glycol monomethyl ether were stirred and mixed together until a uniform solution was obtained, 266 g of a composite oxide sol 2 consisting of $TiO_2$, $ZrO_2$ and $SiO_2$ ($TiO_2/ZrO_2/SiO_2$=65/5/30 (weight ratio), titanium oxide was of an anatase type, dispersed in methanol and had an average particle diameter of 10 nm and a nonvolatile content of 30%) was added, stirred and mixed until a uniform solution was obtained, and 0.5 g of the Florad FC-430 of 3M Co., Ltd. was added as a leveling agent and stirred. The obtained composition was designated as primer coat solution 3.

61 g of a polyester polyol consisting of isophthalic acid and 3-methyl-1,5-pentanediol and having an average molecular weight of 490 and a hydroxyl group value of 226 mgKOH/g, 118 g of a propylene glycol methyl acetate solution containing 70 wt % of a trimer of hexamethylne diisocyanate blocked by β-diketone and 630 g of propylene glycol monomethyl ether were stirred and mixed together until a uniform solution was obtained, 187 g of a composite oxide sol 3 consisting of $TiO_2$, $ZrO_2$ and $SiO_2$ ($TiO_2$/$ZrO_2$/$SiO_2$=79/1/20 (weight ratio), titanium oxide was of a rutile type, dispersed in methanol and had an average particle diameter of 10 nm and a nonvolatile content of 30%) was added, stirred and mixed until a uniform solution was obtained, and 0.5 g of the Florad FC-430 of 3M Co., Ltd. was added as a leveling agent and stirred. The obtained composition was designated as primer coat solution 4.

61 g of a polyester polyol consisting of adipic acid and 3-methyl-1,5-pentanediol and having an average molecular weight of 485 and a hydroxyl group value of 231 mgKOH/g, 119 g of a propylene glycol methyl acetate solution containing 70 wt % of a trimer of hexamethylne diisocyanate blocked by β-diketone and 624 g of propylene glycol monomethyl ether were stirred and mixed together until a uniform solution was. obtained, 187 g of the above composite oxide sol 3 was added, stirred and mixed until a uniform solution was obtained, 2 g of a Co(II) salt of 2-ethyl-hexylic acid was added and stirred, and 0.5 g of the Florad FC-430 of 3M Co., Ltd. was added as a leveling agent and stirred. The obtained composition was designated as primer coat solution 5.

Preparation of Hard Coat Solutions 1 to 9

235 g of the same composite oxide sol 1 as used in the preparation of the above primer coat solution 1 was weighed. 140 g of distilled water was added under agitation. 191 g of γ-glycidoxypropyltrimethoxysilane and 42 g of tetramethoxysilane were gradually added. After the end of addition, they were stirred for another 2 hours. Thereafter, 373 g of propylene glycol monomethyl ether was added while the mixed solution was stirred and then 2 g of tetraethylene glycol monomethacrylate was added. 8 g of acetylacetone aluminum as a curing catalyst and 0.4 g of a silicone surfactant (L-7001 of Nippon Unicar Co., Ltd.) as a leveling agent were further added and stirred for 1 hour. The above mixed solution was aged at room temperature for 48 hours to obtain a hard coat solution 1.

235 g of the above composite oxide sol 1 was weighed. 140 g of distilled water was added under agitation. 191 g of γ-glycidoxypropyltrimethoxysilane and 42 g of tetramethoxysilane were gradually added. After the end of addition, they were stirred for another 2 hours. Thereafter, 373 g of propylene glycol monomethyl ether was added while the mixed solution was stirred and then 2 g of tetraethylene glycol monomethacrylate was added. 8 g of acetylacetone aluminum as a curing catalyst and 0.4 g of a silicone surfactant (L-7001 of Nippon Unicar Co. Ltd.) as a leveling agent were further added and stirred for 1 hour. 2 g of Co(II) acetylacetonato dehydrate was still further added and stirred. The above mixed solution was aged at room tempetature for 48 hours to obtain a hard coat solution 2.

295 g of the above composite oxide sol 2 was weighed. 115 g of distilled water was added under agitation. 178 g of γ-glycidoxypropyltrimethoxysilane was gradually added. After the end of addition, it was stirred for another 2 hours. Thereafter, 378 g of isopropyl alcohol was added while the mixed solution was stirred and then 15 g of tetraethylene glycol monomethacrylate was added. 7 g of acetylacetone aluminum as a curing catalyst and 0.4 g of a silicone surfactant (L-7001 of Nippon Unicar Co., Ltd.) as a leveling agent were further added and stirred for 1 hour. The above mixed solution was aged at room temperature for 48 hours to obtain a hard coat solution 3.

295 g of the above composite oxide sol 2 was weighed. 115 g of distilled water was added under agitation. 178 g of γ-glycidoxypropyltrimethoxysilane was gradually added. After the end of addition, it was stirred for another 2 hours. Thereafter, 378 g of isopropyl alcohol was added while the mixed solution was stirred and then 15 g of tetraethylene glycol monomethacrylate was added. 7 g of acetylacetone aluminum as a curing catalyst and 0.4 g of a silicone surfactant (L-7001 of Nippon Unidar Co., Ltd.) as a leveling agent were further added and stirred for 1 hour. 4.6 g of Co(II) acetylacetonato dehydrate and 2.3 g of 4,4'-thiobis (3-methyl-6-t-butylphenol) were still further added and stirred. The above mixed solution was aged at room temperature for 48 hours to obtain a hard coat solution 4.

A hard coat solution 5 was obtained in the same manner as the hard coat solution 4 except that 6.9 g of a Co(II) salt of 2-ethyl-hexylic acid was added in place of the Co(II) acetylacetonato dehydrate and 4,4'-thiobis(3-methyl-6-t-butylphenol) in the preparation of the hard coat solution 4.

261 g of the above composite oxide sol 3 was weighed. 140 g of distilled water was added under agitation. 181 g of γ-glycidoxypropyltrimethoxysilane was gradually added. Thereafter, 39 g of tetraethyl orthosilicate was added under agitation and then further stirred for 2 hours. Thereafter, 361 g of propylene glycol monomethyl ether was added while the mixed solution was stirred, and then 2 g of tetraethylene glycol monomethacrylate was added. 9 g of acetylacetone aluminum as a curing catalyst and 0.4 g of a silicone surfactant (L-7001 of Nippon Unicar Co., Ltd.) as a leveling mixed solution was aged at room temperature for 48 hours to obtain a hard coat solution 6.

After 1 kg of the above hard coat solution 6 was prepared separately, 2 g of Co(II) acetylacetonato dihydrate was added and stirred for 1 hour. The above mixed solution was aged at room temperature for 48 hours to obtain a hard coat solution 7.

348 g of the above composite oxide sol 3 was weighed. 110 g of distilled water was added under agitation. 148 g of γ-glycidoxypropyltrimethoxysilane was gradually added and further stirred for 2 hours. Thereafter, 368 g of propylene glycol monomethyl ether was added while the mixed solution was stirred, and then 11 g of tetraethylene glycol monomethacrylate was added. 6 g of acetylacetone aluminum as acuring catalyst and 0.4 g of a silicone surfactant (L-7001 of Nippon Unicar Co., Ltd.) as a leveling agent were further added and stirred for 1 hour. The above mixed solution was aged at room temperature for 48 hours to obtain a hard coat solution 8.

After 1 kg of the above hard coat solution 8 was prepared separately, 5.0 g of a Co(II) salt of 2-ethyl-hexylic acid was added and stirred for 1 hour. The above mixed solution was aged at room temperature for 48 hours to obtain a hard coat solution 9.

Examples 1 to 8 and 12 to 14 and Comparative Examples 1 to 4

The above primer coat solutions 1 to 5 were each applied to the following two different lens substrates by the following methods and cured by heating and then the above hard coat solutions 1 to 9 were each applied to the above substrates by the following dip coating and cured by heating. The evaluation results of the properties of the obtained coated lenses are shown in Table 2. The thickness and refractive index (nD) of each film measured by the following methods are shown in Table 1. The results of a weatherability test measured by the following method are shown in Tables 3 and 4.

Lens Substrate:

The following lens substrates A and B were used.

substrate A: plastic spectacle lens made from a thiourethane resin having a refractive index of 1.594 and manufactured by molding and thermosetting the MR-6 monomer of Mitsui Toatsu Chemicals, Inc.

substrate B: plastic spectacle lens made from a thiourethane resin having a refractive index of 1.66.and manufactured by molding and thermosetting the MR-7 monomer of Mitsui Toatsu Chemicals, Inc.

application and curing methods of primer coat solution:

The lens substrate is immersed in a primer coat solution, pulled up at a rate of 10 cm/min, dried at room temperature for about 10 minutes and heated at 95° C. for 30 minutes to cure a coating film.

application and curing methods of hard coat solution:

The lens substrate (or substrate with a cured primer layer) is immersed in a hard coat solution, pulled up at a rate of 15 cm/min, dried at room temperature for about 5 minutes and heated at 120° C. for 1 hour to cure a hard coat layer.

Measurement of Film Thickness:

Each of the coat solutions is applied to a glass plate and is cured, part of the coating film is chipped off and the resulting level difference is measured to obtain the thickness of the film. It has been confirmed that whether the substrate is the above substrate A or B, the thickness of the obtained film remains the same as that of the above glass plate.

Measurement of Weatherability:

The appearance adhesion and hardness of a film after 60, 120, 180 and 240 hours of irradiation are evaluated as follows using a xenon weather-ometer weatherability tester (black panel temperature of 630°°C., water sprayed for 18 minutes every 2 hours, irradiation intensity of 0.35 W/m² at 340 nm).

appearance: observed with the eye and ranked as follows.

A-no change
B-part of the lens slightly cracks
C-about 1/3 of the area of the lens cracks
D-all the surface of the lens cracks adhesion: A cross-hatch test is conducted in accordance with a cross cut adhesion test JIS K5400. That is, 11 parallel lines are cut on the surface of the film in both longitudinal and transverse directions at intervals of 1 mm by a knife to form 100 squares and Cellotape is affixed to the squares and then peeled off to count the number of squares adhered to the substrate from which the film is not peeled. The proportion (%) of the number of the squares to the total number of squares is taken as adhesion.

hardness: The film is rubbed with steel wool #0000 10 times under a load of 1 kg to measure the scratching of the film based on the following criteria.

5: not scratched at all
4: slightly scratched
3: scratched
2: badly scratched
1: scratched to the substrate

TABLE 1

| type of solution | film thickness ($\mu$m) | refractive index |
| --- | --- | --- |
| primer 1 | 1.1 | 1.59 |
| primer 2 | 1.2 | 1.59 |
| primer 3 | 1.1 | 1.66 |
| primer 4 | 1.2 | 1.59 |
| primer 5 | 1.2 | 1.59 |
| hard coat 1 | 2.2 | 1.59 |
| hard coat 2 | 2.2 | 1.59 |
| hard coat 3 | 1.5 | 1.63 |
| hard coat 4 | 1.5 | 1.63 |
| hard coat 5 | 1.5 | 1.63 |
| hard coat 6 | 2.1 | 1.59 |
| hard coat 7 | 2.1 | 1.59 |
| hard coat 8 | 2.1 | 1.63 |
| hard coat 9 | 2.1 | 1.63 |

TABLE 2

| No. | lens substrate | primer solution | hard coat solution | adhesion | hardness |
| --- | --- | --- | --- | --- | --- |
| Ex. 1 | A | 1 | 2 | 100% | 5 |
| Ex. 2 | A | 2 | 1 | 100% | 5 |
| Ex. 3 | A | 2 | 2 | 100% | 5 |
| Ex. 4 | A | none | 2 | 100% | 5 |
| Ex. 5 | B | 3 | 4 | 100% | 4 |
| Ex. 6 | B | 3 | 5 | 100% | 4 |
| Ex. 7 | B | none | 4 | 100% | 4 |
| Ex. 8 | B | none | 5 | 100% | 4 |
| Ex. 12 | A | none | 7 | 100% | 5 |
| Ex. 13 | B | 3 | 9 | 100% | 4 |
| Ex. 14 | B | none | 9 | 100% | 4 |
| C.Ex. 1 | A | 1 | 1 | 100% | 5 |
| C.Ex. 2 | A | none | 1 | 100% | 5 |
| C.Ex. 3 | B | 3 | 3 | 100% | 4 |
| C.Ex. 4 | B | none | 3 | 100% | 4 |

TABLE 3

| | weatherability test | | | | | |
| --- | --- | --- | --- | --- | --- | --- |
| | appearance | adhesion | hardness | appearance | adhesion | hardness |
| | after 60 hours | | | after 120 hours | | |
| Ex.1 | A | 100 | 5 | A | 100 | 5 |
| Ex.2 | A | 100 | 5 | A | 100 | 5 |
| Ex.3 | A | 100 | 5 | A | 100 | 5 |
| Ex.4 | A | 100 | 5 | A | 100 | 5 |
| Ex.5 | A | 100 | 4 | A | 100 | 4 |
| Ex.6 | A | 100 | 4 | A | 100 | 4 |
| Ex.7 | A | 100 | 4 | A | 100 | 4 |
| Ex.8 | A | 100 | 4 | B | 100 | 4 |
| C.Ex.1 | A | 100 | 5 | A | 100 | 5 |
| C.Ex.2 | A | 100 | 5 | A | 100 | 5 |
| C.Ex.3 | A | 100 | 4 | B | 100 | 4 |
| C.Ex.4 | A | 100 | 4 | B | 100 | 4 |
| | after 180 hours | | | after 240 hours | | |
| Ex.1 | A | 100 | 4 | B | 100 | 2 |
| Ex.2 | B | 100 | 3 | C | 100 | 2 |
| Ex.3 | A | 100 | 4 | B | 100 | 2 |
| Ex.4 | A | 100 | 4 | B | 100 | 2 |
| Ex.5 | A | 100 | 3–4 | B | 100 | 2 |
| Ex.6 | A | 100 | 3–4 | B | 100 | 2 |
| Ex.7 | A | 100 | 3–4 | B | 100 | 2 |
| Ex.8 | A | 100 | 3 | B | 100 | 2 |
| C.Ex.1 | B | 0 | 2 | D | 0 | 1 |
| C.Ex.2 | B | 0 | 2 | C | 0 | 1 |

TABLE 3-continued

| | weatherability test | | | | | |
|---|---|---|---|---|---|---|
| | appearance | adhesion | hardness | appearance | adhesion | hardness |
| C.Ex.3 | C | 0 | 2 | D | 0 | 1 |
| C.Ex.4 | C | 0 | 2 | D | 0 | 1 |

TABLE 4

| | weatherability test | | |
|---|---|---|---|
| | appearance | adhesion | hardness |
| after 60 hours | | | |
| Ex. 12 | A | 100 | 5 |
| Ex. 13 | A | 100 | 4 |
| Ex. 14 | A | 100 | 4 |
| after 120 hours | | | |
| Ex. 12 | A | 100 | 5 |
| Ex. 13 | A | 100 | 4 |
| Ex. 14 | A | 100 | 4 |
| after 180 hours | | | |
| Ex. 12 | A | 100 | 5 |
| Ex. 13 | A | 100 | 4 |
| Ex. 14 | A | 100 | 4 |
| after 240 hours | | | |
| Ex. 12 | A | 100 | 4 |
| Ex. 13 | A | 100 | 3~4 |
| Ex. 14 | A | 100 | 3~4 |

Examples 1 to 8 and 12 to 14 and Comparative Examples 1 to 4 are satisfactory in terms of appearance, film adhesion and film hardness after 120 hours of a weatherability test but differences in these properties is observed among them after 180 hours of the weatherability test.

Film adhesion is satisfactory even after 240 hours in Examples 1 to 8 and 12 to 14 but film adhesion is lost after 240 hours in Comparative Examples 1 to 4, When anatase type titanium oxide is used, film hardness is satisfactory after 180 hours in Examples 1 to 8 but it deteriorates after 180 hours in Comparative Examples 1 to 4, When rutile type titanium oxide is used, film hardness is satisfactory after 240 hours in Examples 12 to 14, When anatase type titanium oxide is used, Examples 1 to 8 are superior in film appearance to Comparative Examples 1 to 4, When rutile type titanium oxide is used, both Examples and Comparative Examples are satisfactory after 240 hours.

What is claimed is:

1. A plastic lens comprising a plastic lens substrate having a refractive index of 1.50 or more and a hard coat layer which is formed on the surface of the substrate directly or through a primer layer, the hard coat layer comprising:
   (1) 2 to 70 wt % of titanium oxide or a composite oxide thereof having a particle diameter of 1.0 to 100 nm, the titanium oxide containing at least one titanium oxide selected from the group consisting of rutile type titanium oxide and anatase type titanium oxide in an amount of 50 wt % or more;
   (2) 1 to 10 wt % of a chelate compound or fatty acid salt containing Co(II);
   (3) 20 to 97.9 wt % of a silicon resin, and
   (4) 0.001 to 10 wt % of a curing catalyst selected from the group consisting of alkali metal salts and ammonium salts of carboxylic acids, metal salts and ammonium salts of acetylacetone, metal salts of ethyl acetoacetate; metal salts coordinated with acetylacetone and ethyl acetoacetate, metal salt hydrates of ethylene diamine, primary to tertiary amines, polyalkylene amines, sulfonates, magnesium perchlorate, ammonium perchlorates, and combinations of these compounds and organic mercaptan or mercaptoalkylenesilane, but being different from said chelate compound or fatty acid salt containing Co(II), and having a refractive index of 1.48 or more and a thickness of 0.5 to 5 μm, the weight percentages of the above components (1), (2) and (3) being based on 100 wt % of the total weight of the components (1), (2) and (3), and the weight percentage of the above component (4) being based on the total weight of the above components (1), (2) and (3).

2. The plastic lens of claim 1, wherein the hard coat layer further comprises an antioxidant having a C—S—C structure in an amount of 0.1 to 5 wt % based on the hard coat layer.

3. The plastic lens of claim 1, wherein the chelate compound or fatty acid salt containing Co(II) is acetylacetonate Co(II) or Co(II) ethylhexylate.

4. The plastic lens of claim 1, wherein the primer layer contains an urethane resin as a resin component and has a refractive index of 1.48 or more.

5. The plastic lens of claim 1 which further has an anti-reflection layer on the exterior surface of the hard coat layer.

* * * * *